(12) United States Patent
Wang et al.

(10) Patent No.: US 11,397,333 B2
(45) Date of Patent: Jul. 26, 2022

(54) OPTICAL DISPLAY SYSTEM, AR DISPLAY DEVICE AND VR DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Chenru Wang, Beijing (CN); Hao Zhang, Beijing (CN); Lili Chen, Beijing (CN); Ruijun Dong, Beijing (CN); Yali Liu, Beijing (CN); Ke Li, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/641,376

(22) PCT Filed: Sep. 9, 2019

(86) PCT No.: PCT/CN2019/104932
§ 371 (c)(1),
(2) Date: Feb. 24, 2020

(87) PCT Pub. No.: WO2020/088107
PCT Pub. Date: May 7, 2020

(65) Prior Publication Data
US 2021/0018760 A1   Jan. 21, 2021

(30) Foreign Application Priority Data
Oct. 30, 2018 (CN) .......................... 201811272620.5

(51) Int. Cl.
*G02B 30/25* (2020.01)
*H04N 13/383* (2018.01)
(Continued)

(52) U.S. Cl.
CPC ....... *G02B 30/25* (2020.01); *G02F 1/133528* (2013.01); *G06F 3/013* (2013.01); *H04N 13/383* (2018.05)

(58) Field of Classification Search
CPC  G02B 30/25; H04N 13/383; G02F 1/133528; G06F 3/013
See application file for complete search history.

(56) References Cited

U.S. PATENT DOCUMENTS 2,883,906 A * 4/1959 Rehorn ................. G02B 30/25
348/42
4,995,718 A * 2/1991 Jachimowicz ....... H04N 13/324
348/E13.058

(Continued)

FOREIGN PATENT DOCUMENTS

CN       104297933 A    1/2015
CN       107247333 A    10/2017
(Continued)

*Primary Examiner* — Charles L Beard
(74) *Attorney, Agent, or Firm* — The Webb Law Firm (57) ABSTRACT

An optical display system and an AR/VR display device are provided. The optical display system includes: a display screen; a first optical structure, disposed on a light emitting side of the display screen, and configured to divide light from the display screen into different types of polarized light; and a second optical structure, disposed on an emitting path of the different types of polarized light to an image forming side, and configured to form a plurality of virtual image planes corresponding to at least two focal lengths.

12 Claims, 2 Drawing Sheets

(51) Int. Cl.
*G02F 1/1335* (2006.01)
*G06F 3/01* (2006.01)

(56) References Cited

U.S. PATENT DOCUMENTS

| | | | | |
|---|---|---|---|---|
| 5,264,964 A * | 11/1993 | Faris | H04N 13/31 | 359/464 |
| 5,485,310 A * | 1/1996 | Inada | H04N 9/3167 | 359/489.09 |
| 5,552,840 A * | 9/1996 | Ishii | G02B 30/25 | 348/E13.058 |
| 5,793,341 A * | 8/1998 | Omori | H04N 13/346 | 348/E13.058 |
| 5,815,221 A * | 9/1998 | Kojima | H04N 9/3188 | 348/751 |
| 5,818,399 A * | 10/1998 | Omori | H04N 13/32 | 348/E13.058 |
| 5,822,117 A * | 10/1998 | Kleinberger | H04N 13/373 | 348/E13.058 |
| 5,875,055 A * | 2/1999 | Morishima | H04N 13/315 | 348/E13.043 |
| 6,011,580 A * | 1/2000 | Hattori | H04N 13/398 | 348/E13.058 |
| 6,042,234 A * | 3/2000 | Itoh | H04N 9/3167 | 353/31 |
| 6,067,193 A * | 5/2000 | Sekine | G02B 27/285 | 353/38 |
| 6,147,802 A * | 11/2000 | Itoh | G02B 27/28 | 349/5 |
| 6,181,303 B1 * | 1/2001 | Johnson | H04N 13/398 | 348/E13.058 |
| 6,181,399 B1 * | 1/2001 | Odoi | G02F 1/133528 | 349/96 |
| 6,343,864 B1 * | 2/2002 | Tajiri | G03B 21/006 | 349/9 |
| 6,449,090 B1 * | 9/2002 | Omar | H04N 13/368 | 359/464 |
| 6,628,346 B1 * | 9/2003 | Ebiko | G02B 27/283 | 353/34 |
| 6,819,365 B1 * | 11/2004 | Peng | H04N 9/3105 | 353/31 |
| 7,190,518 B1 * | 3/2007 | Kleinberger | G02B 30/25 | 348/57 |
| 7,419,265 B2 * | 9/2008 | Relke | H04N 13/359 | 348/E13.043 |
| 7,926,949 B1 * | 4/2011 | Boothroyd | G03B 35/24 | 359/465 |
| 8,044,879 B2 * | 10/2011 | Matveev | G02B 30/34 | 348/42 |
| 8,049,772 B2 * | 11/2011 | Lipton | G09G 3/20 | 348/42 |
| 8,164,620 B2 * | 4/2012 | Hsu | G02B 30/25 | 348/51 |
| 8,223,089 B2 * | 7/2012 | Kusuno | H04N 13/351 | 345/32 |
| 8,388,138 B1 * | 3/2013 | Boothroyd | H04N 9/3167 | 359/464 |
| 8,462,201 B2 * | 6/2013 | Lin | H04N 13/398 | 348/57 |
| 8,472,120 B2 * | 6/2013 | Border | G02B 27/017 | 359/13 |
| 8,587,639 B2 * | 11/2013 | Matthews | H04N 13/366 | 348/51 |
| 8,587,642 B2 * | 11/2013 | Shestak | H04N 13/302 | 348/55 |
| 8,651,684 B2 * | 2/2014 | Mehrle | H04N 13/312 | 359/464 |
| 8,786,539 B2 * | 7/2014 | Lee | H04N 13/00 | 345/102 |
| 8,836,769 B2 * | 9/2014 | Tsubaki | H04N 13/32 | 348/42 |
| 8,866,702 B1 * | 10/2014 | Wong | G06F 3/013 | 345/9 |
| 8,878,917 B2 * | 11/2014 | Kleinberger | H04N 13/324 | 348/59 |
| 9,098,112 B2 * | 8/2015 | Cheng | G06F 3/013 | |
| 9,116,337 B1 * | 8/2015 | Miao | G02B 3/14 | |
| 9,247,286 B2 * | 1/2016 | Karaoguz | H04N 21/4316 | |
| 9,299,312 B2 * | 3/2016 | Wyatt | G09G 5/006 | |
| 9,363,504 B2 * | 6/2016 | Cha | H04N 13/359 | |
| 9,374,573 B2 * | 6/2016 | Kim | H04N 13/366 | |
| 9,414,049 B2 * | 8/2016 | Gaudreau | H04N 13/106 | |
| 9,479,767 B2 * | 10/2016 | Van Der Horst | H04N 13/359 | |
| 9,521,403 B2 * | 12/2016 | Hamagishi | H04N 13/376 | |
| 9,594,298 B2 * | 3/2017 | Schuck | G02B 30/24 | |
| 9,740,030 B2 * | 8/2017 | Liu | G02F 1/133351 | |
| 9,826,299 B1 * | 11/2017 | Osterhout | H04R 1/028 | |
| 10,088,685 B1 * | 10/2018 | Aharoni | G02B 6/0076 | |
| 10,175,489 B1 * | 1/2019 | Robbins | G02B 6/0016 | |
| 10,197,810 B2 * | 2/2019 | Seo | G02B 5/3025 | |
| 10,437,071 B2 * | 10/2019 | Tremblay | G02B 27/0172 | |
| 10,437,120 B1 * | 10/2019 | Jutamulia | G09G 3/2007 | |
| 10,488,921 B1 * | 11/2019 | Ouderkirk | G06F 1/163 | |
| 10,520,742 B1 * | 12/2019 | Sulai | G06F 3/013 | |
| 10,545,348 B1 * | 1/2020 | Lu | G02B 6/0056 | |
| 10,877,274 B1 * | 12/2020 | Trail | G02B 27/14 | |
| 10,955,705 B2 * | 3/2021 | Sato | G02F 1/116 | |
| 10,978,008 B2 * | 4/2021 | Lee | G02B 27/0172 | |
| 11,145,132 B2 * | 10/2021 | Haddick | G02B 5/30 | |
| 2002/0080487 A1 * | 6/2002 | Yajima | G02B 27/285 | 348/E9.027 |
| 2002/0126228 A1 * | 9/2002 | Yajima | G02F 1/133528 | 349/8 |
| 2003/0001986 A1 * | 1/2003 | Fukuda | G02F 1/133528 | 349/95 |
| 2003/0058408 A1 * | 3/2003 | Magarill | G02B 5/3033 | 353/20 |
| 2003/0147112 A1 * | 8/2003 | Mukawa | G02F 1/13362 | 348/E9.027 |
| 2003/0189676 A1 * | 10/2003 | Kato | G03B 21/006 | 349/5 |
| 2003/0218724 A1 * | 11/2003 | Yatsu | G02B 27/283 | 353/31 |
| 2004/0075787 A1 * | 4/2004 | Li | H04N 9/315 | 349/67 |
| 2004/0125246 A1 * | 7/2004 | Okamori | G02B 27/285 | 349/5 |
| 2004/0222945 A1 * | 11/2004 | Taira | H04N 13/359 | 348/E13.044 |
| 2006/0039068 A1 * | 2/2006 | Tokita | G02B 27/286 | 359/489.07 |
| 2006/0055838 A1 * | 3/2006 | Mi | G02F 1/133536 | 349/30 |
| 2006/0109399 A1 * | 5/2006 | Kubota | G02F 1/133536 | 349/96 |
| 2007/0146880 A1 * | 6/2007 | Bleha | G02B 27/145 | 359/468 |
| 2008/0143965 A1 * | 6/2008 | Cowan | G02B 30/25 | 353/8 |
| 2008/0174848 A1 * | 7/2008 | Kim | H04N 13/32 | 348/E13.044 |
| 2008/0225236 A1 * | 9/2008 | Schuck | G03B 21/28 | 353/20 |
| 2008/0231952 A1 * | 9/2008 | Kim | G02B 30/32 | 359/465 |
| 2008/0297671 A1 * | 12/2008 | Cha | H04N 13/32 | 345/102 |
| 2009/0009594 A1 * | 1/2009 | Kawai | H04N 13/398 | 348/E13.001 |
| 2009/0009720 A1 * | 1/2009 | Chen | H04N 9/3105 | 353/20 |
| 2009/0046253 A1 * | 2/2009 | Sunaga | G03B 21/208 | 359/485.06 |
| 2009/0051878 A1 * | 2/2009 | Hsu | G02B 30/25 | 353/8 |
| 2009/0051880 A1 * | 2/2009 | Ito | H04N 9/3144 | 353/52 |
| 2009/0058994 A1 * | 3/2009 | Kao | H04N 13/341 | 348/51 |

(56) References Cited

U.S. PATENT DOCUMENTS

| | | | |
|---|---|---|---|
| 2009/0059172 A1* | 3/2009 | Hsu | H04N 13/341 353/8 |
| 2009/0079885 A1* | 3/2009 | Hsu | H04N 13/337 348/756 |
| 2009/0091814 A1* | 4/2009 | Hsu | G02B 30/25 359/237 |
| 2009/0103051 A1* | 4/2009 | Hsu | G02B 30/24 353/8 |
| 2009/0128780 A1* | 5/2009 | Schuck | G02B 30/24 353/8 |
| 2009/0147152 A1* | 6/2009 | Ishii | H04N 9/3152 348/744 |
| 2009/0185138 A1* | 7/2009 | Kubara | H04N 13/307 353/8 |
| 2009/0219456 A1* | 9/2009 | Okumura | G03B 21/006 349/5 |
| 2009/0303443 A1* | 12/2009 | Wachter | H04N 9/3167 353/20 |
| 2010/0008206 A1* | 1/2010 | Jeong | G11B 7/1369 |
| 2010/0103516 A1* | 4/2010 | McKnight | A63F 13/10 359/464 |
| 2010/0110166 A1* | 5/2010 | Chang | H04N 13/337 348/57 |
| 2010/0182571 A1* | 7/2010 | Nishikawa | G02B 30/25 353/34 |
| 2010/0188487 A1* | 7/2010 | Lee | H01L 27/14818 348/E13.074 |
| 2010/0188590 A1* | 7/2010 | Yamaguchi | H04N 9/3167 349/9 |
| 2010/0202048 A1* | 8/2010 | Amitai | G02B 27/28 359/485.02 |
| 2010/0253920 A1* | 10/2010 | Miyazawa | G02B 27/149 353/20 |
| 2010/0328560 A1* | 12/2010 | Tanaka | G02B 27/283 349/9 |
| 2011/0007279 A1* | 1/2011 | Silverstein | H04N 13/337 353/8 |
| 2011/0051092 A1* | 3/2011 | Mashitani | G02B 30/25 353/8 |
| 2011/0128503 A1* | 6/2011 | Sawai | G03B 35/26 353/7 |
| 2011/0193880 A1* | 8/2011 | Imai | H04N 9/3167 349/1 |
| 2011/0194048 A1* | 8/2011 | Izaki | G02F 1/133528 359/489.07 |
| 2011/0205495 A1* | 8/2011 | Coleman | G02B 27/283 359/489.08 |
| 2011/0221656 A1* | 9/2011 | Haddick | H04N 5/2254 345/156 |
| 2011/0221716 A1* | 9/2011 | Sugiyama | H04N 13/363 345/204 |
| 2011/0222022 A1* | 9/2011 | Sato | G03B 21/2073 353/20 |
| 2011/0235485 A1* | 9/2011 | Mikami | G11B 7/0065 369/44.37 |
| 2011/0249238 A1* | 10/2011 | Liao | G03B 35/26 353/20 |
| 2011/0310350 A1* | 12/2011 | Maeda | H04N 9/3167 359/487.01 |
| 2011/0317129 A1* | 12/2011 | Hsu | H04N 13/31 353/8 |
| 2012/0026584 A1* | 2/2012 | Chuang | H04N 13/341 359/465 |
| 2012/0069276 A1* | 3/2012 | Ishikawa | G02F 1/1396 349/103 |
| 2012/0081622 A1* | 4/2012 | Horikoshi | H04N 9/3167 349/9 |
| 2012/0162609 A1* | 6/2012 | Yamaguchi | H04N 9/3167 359/489.08 |
| 2012/0170000 A1* | 7/2012 | Imaoka | G02B 27/283 353/20 |
| 2012/0188470 A1* | 7/2012 | Tanaka | G02F 1/133528 349/5 |
| 2012/0194768 A1* | 8/2012 | Horikoshi | G02B 27/285 362/19 |
| 2012/0212484 A1* | 8/2012 | Haddick | G06Q 30/02 345/419 |
| 2012/0212499 A1* | 8/2012 | Haddick | G02B 27/0093 345/589 |
| 2012/0212814 A1* | 8/2012 | Endo | G02B 30/25 359/465 |
| 2012/0218301 A1* | 8/2012 | Miller | G06Q 30/02 345/633 |
| 2012/0256879 A1* | 10/2012 | Liu | G06F 3/0425 353/34 |
| 2012/0257024 A1* | 10/2012 | Inaba | G02B 7/102 348/E13.074 |
| 2012/0268719 A1* | 10/2012 | Yamaguchi | G02B 27/283 353/20 |
| 2013/0033756 A1* | 2/2013 | Spitzer | G02B 27/01 359/630 |
| 2013/0038837 A1* | 2/2013 | Freeman | G02B 30/24 353/8 |
| 2013/0076995 A1* | 3/2013 | Huang | H04N 13/337 349/5 |
| 2013/0083172 A1* | 4/2013 | Baba | H04N 13/257 348/49 |
| 2013/0106674 A1* | 5/2013 | Wheeler | G02B 27/0176 345/8 |
| 2013/0107218 A1* | 5/2013 | Ebbesmeier | G02B 30/25 353/121 |
| 2013/0120713 A1* | 5/2013 | Homma | H04N 13/324 353/20 |
| 2013/0127980 A1* | 5/2013 | Haddick | G06F 3/013 348/14.08 |
| 2013/0135588 A1* | 5/2013 | Popovich | G03B 21/2033 359/489.08 |
| 2013/0135722 A1* | 5/2013 | Yokoyama | G02B 27/0172 359/489.08 |
| 2013/0155378 A1* | 6/2013 | Huang | G02B 30/25 353/8 |
| 2013/0170030 A1* | 7/2013 | Huang | G02B 30/25 359/465 |
| 2013/0194522 A1* | 8/2013 | Endo | G02B 30/25 349/15 |
| 2013/0194548 A1* | 8/2013 | Francis | A61B 3/12 351/208 |
| 2013/0207887 A1* | 8/2013 | Raffle | G02B 27/0176 345/156 |
| 2013/0278631 A1* | 10/2013 | Border | G06Q 30/02 345/633 |
| 2013/0300766 A1* | 11/2013 | Mukawa | G02B 27/0179 345/633 |
| 2013/0301010 A1* | 11/2013 | Huang | G02B 30/25 353/8 |
| 2013/0321718 A1* | 12/2013 | Huang | G02B 30/25 349/5 |
| 2013/0329191 A1* | 12/2013 | Hsu | G03B 35/26 353/8 |
| 2013/0335682 A1* | 12/2013 | Gilbert | G09G 3/3426 349/85 |
| 2014/0028815 A1* | 1/2014 | Atkins | H04N 13/341 348/58 |
| 2014/0029096 A1* | 1/2014 | Kessler | G02B 30/25 359/465 |
| 2014/0049698 A1* | 2/2014 | Hirata | G02B 30/25 349/8 |
| 2014/0218648 A1* | 8/2014 | Palmer | G02B 30/25 359/465 |
| 2014/0285878 A1* | 9/2014 | Escuti | G02F 1/13363 156/60 |
| 2014/0292620 A1* | 10/2014 | Lapstun | G09G 5/10 345/6 |
| 2014/0307005 A1* | 10/2014 | Kita | G02B 7/008 349/9 |
| 2014/0347572 A1* | 11/2014 | Liu | G02C 11/10 349/11 |

(56) References Cited

U.S. PATENT DOCUMENTS

| | | | |
|---|---|---|---|
| 2014/0347736 A1* | 11/2014 | Liu | G02F 1/1362 29/592 |
| 2015/0042704 A1* | 2/2015 | Smith | G09G 3/3406 345/1.3 |
| 2015/0177591 A1* | 6/2015 | Sugiyama | G02B 27/0093 359/298 |
| 2015/0205132 A1* | 7/2015 | Osterhout | G06F 3/013 345/633 |
| 2015/0205135 A1* | 7/2015 | Border | G06V 20/20 359/630 |
| 2015/0249521 A1* | 9/2015 | Ono | G03B 21/2033 398/65 |
| 2015/0253573 A1* | 9/2015 | Sako | H04N 13/398 345/207 |
| 2015/0271479 A1* | 9/2015 | Huang | G03B 21/2073 348/51 |
| 2015/0301356 A1* | 10/2015 | Tabirian | G02B 27/4211 351/44 |
| 2016/0011353 A1* | 1/2016 | Escuti | G02B 6/105 359/15 |
| 2016/0018639 A1* | 1/2016 | Spitzer | G02B 27/283 359/13 |
| 2016/0018645 A1* | 1/2016 | Haddick | G02B 5/30 345/8 |
| 2016/0018646 A1* | 1/2016 | Osterhout | G06F 1/203 345/8 |
| 2016/0021358 A1* | 1/2016 | Yang | G02B 27/0093 345/8 |
| 2016/0033781 A1* | 2/2016 | Wang | G02B 30/27 445/25 |
| 2016/0048069 A1* | 2/2016 | Inoue | H04N 5/372 359/247 |
| 2016/0062121 A1* | 3/2016 | Border | G02B 27/0176 359/630 |
| 2016/0062128 A1* | 3/2016 | Inoue | G02B 27/0905 349/25 |
| 2016/0077335 A1* | 3/2016 | An | G02B 27/0101 359/489.08 |
| 2016/0077351 A1* | 3/2016 | Iwane | G02B 17/002 359/489.08 |
| 2016/0091722 A1* | 3/2016 | Liu | H04N 5/332 345/8 |
| 2016/0109709 A1* | 4/2016 | Osterhout | G02B 27/0172 359/614 |
| 2016/0116745 A1* | 4/2016 | Osterhout | H04R 1/105 359/614 |
| 2016/0116979 A1* | 4/2016 | Border | G06T 19/006 345/156 |
| 2016/0131912 A1* | 5/2016 | Border | G02B 5/28 345/8 |
| 2016/0139419 A1* | 5/2016 | Huang | H04N 13/334 359/465 |
| 2016/0147070 A1* | 5/2016 | Border | G06F 3/013 359/633 |
| 2016/0161743 A1* | 6/2016 | Osterhout | G06F 1/163 345/8 |
| 2016/0170224 A1* | 6/2016 | Palmer | H04N 13/363 359/465 |
| 2016/0196849 A1* | 7/2016 | Kim | G11B 7/1365 369/103 |
| 2016/0223819 A1* | 8/2016 | Liu | G06F 3/013 |
| 2016/0241843 A1* | 8/2016 | Zhou | G02B 30/25 |
| 2016/0246055 A1* | 8/2016 | Border | G02B 27/0172 |
| 2016/0246068 A1* | 8/2016 | Liu | G03B 21/2073 |
| 2016/0252796 A1* | 9/2016 | Smith | G02B 6/3588 349/196 |
| 2016/0277726 A1* | 9/2016 | Tsang | G02B 30/25 |
| 2016/0282636 A1* | 9/2016 | Wang | G02C 7/083 |
| 2016/0286210 A1* | 9/2016 | Border | G02B 7/08 |
| 2016/0301920 A1* | 10/2016 | Lim | H04N 13/363 |
| 2016/0320665 A1* | 11/2016 | Cho | G02F 1/133617 |
| 2016/0377867 A1* | 12/2016 | Kessler | G02B 27/0172 359/482 |
| 2017/0052379 A1* | 2/2017 | Yang | G02B 27/0179 |
| 2017/0059869 A1* | 3/2017 | Lee | G02C 11/10 |
| 2017/0065166 A1* | 3/2017 | Sudou | A61B 3/024 |
| 2017/0068094 A1* | 3/2017 | Webster | G02B 6/0008 |
| 2017/0115491 A1* | 4/2017 | Shi | G02B 3/0056 |
| 2017/0160440 A1* | 6/2017 | Yadin | G02B 3/0081 |
| 2017/0212352 A1* | 7/2017 | Cobb | G02B 27/0179 |
| 2017/0227770 A1* | 8/2017 | Carollo | G02B 27/0172 |
| 2017/0227777 A1* | 8/2017 | Carollo | G02B 27/286 |
| 2017/0293156 A1* | 10/2017 | Saracco | H04N 9/3161 |
| 2018/0059517 A1* | 3/2018 | Aizaki | G03B 21/006 |
| 2018/0061058 A1* | 3/2018 | Xu | G06K 9/6269 |
| 2018/0107000 A1* | 4/2018 | Sung | G02B 27/283 |
| 2018/0120562 A1* | 5/2018 | Yata | G02B 27/0101 |
| 2018/0120567 A1* | 5/2018 | Cobb | G02B 27/0172 |
| 2018/0120634 A1* | 5/2018 | Chen | G02B 6/0053 |
| 2018/0172999 A1* | 6/2018 | Sulai | G02B 27/0172 |
| 2018/0180889 A1* | 6/2018 | Lee | G02F 1/133528 |
| 2018/0196390 A1* | 7/2018 | Collin | G03H 1/2286 |
| 2018/0203243 A1* | 7/2018 | Huang | G02B 30/25 |
| 2018/0210222 A1* | 7/2018 | Seo | G02B 5/3025 |
| 2018/0217390 A1* | 8/2018 | Zha | G02B 6/0048 |
| 2018/0234675 A1* | 8/2018 | Cheng | H04N 13/332 |
| 2018/0275419 A1* | 9/2018 | Saracco | G02B 27/283 |
| 2018/0284470 A1* | 10/2018 | Yamamoto | G02B 30/56 |
| 2018/0322845 A1* | 11/2018 | Machida | G02B 26/026 |
| 2018/0335629 A1* | 11/2018 | Cheng | G02B 27/0103 |
| 2018/0341110 A1* | 11/2018 | Hirata | G02B 27/286 |
| 2018/0348562 A1* | 12/2018 | Yoshida | G02F 1/133605 |
| 2018/0373116 A1* | 12/2018 | Wang | G02C 7/12 |
| 2019/0025588 A1* | 1/2019 | Osterhout | H04N 5/232 |
| 2019/0025589 A1* | 1/2019 | Haddick | G02B 27/0172 |
| 2019/0033699 A1* | 1/2019 | Iigahama | G03B 21/14 |
| 2019/0079380 A1* | 3/2019 | Yanai | G03B 21/62 |
| 2019/0086674 A1* | 3/2019 | Sinay | G02B 27/0172 |
| 2019/0086675 A1* | 3/2019 | Carollo | G02B 27/0955 |
| 2019/0107719 A1* | 4/2019 | Edwin | G02B 27/0172 |
| 2019/0179062 A1* | 6/2019 | Nawata | G02B 30/25 |
| 2019/0204491 A1* | 7/2019 | Hong | G02F 1/0134 |
| 2019/0212700 A1* | 7/2019 | An | G02B 30/25 |
| 2019/0243147 A1* | 8/2019 | Smithwick | G02B 27/0103 |
| 2019/0253678 A1* | 8/2019 | Saracco | H04N 9/3161 |
| 2019/0285939 A1* | 9/2019 | Lee | G02B 6/0056 |
| 2019/0287495 A1* | 9/2019 | Mathur | G09G 5/391 |
| 2019/0346811 A1* | 11/2019 | Min | G03H 1/0443 |
| 2019/0394429 A1* | 12/2019 | Tanaka | G03B 33/12 |
| 2020/0007857 A1* | 1/2020 | Kasahara | G09F 9/00 |
| 2020/0017029 A1* | 1/2020 | Taguchi | G02F 1/1347 |
| 2020/0026087 A1* | 1/2020 | Cai | G02B 27/0172 |
| 2020/0057305 A1* | 2/2020 | Jiang | G02B 27/283 |
| 2020/0068191 A1 | 2/2020 | Yu et al. | |
| 2020/0117007 A1* | 4/2020 | Smithwick | G02B 27/283 |
| 2020/0142200 A1* | 5/2020 | Sato | G02F 1/116 |
| 2020/0142213 A1* | 5/2020 | Sato | G02F 1/13363 |
| 2020/0159037 A1 | 5/2020 | Li et al. | |
| 2020/0201049 A1* | 6/2020 | Ukai | G02B 27/0172 |
| 2020/0201065 A1* | 6/2020 | Zhang | G02B 30/24 |
| 2020/0249480 A1* | 8/2020 | Martinez | G02B 27/0172 |
| 2020/0310121 A1* | 10/2020 | Choi | G02B 6/34 |
| 2020/0310204 A1* | 10/2020 | Peng | G02F 1/133632 |
| 2020/0355861 A1* | 11/2020 | Ogawa | B32B 7/023 |
| 2020/0371369 A1* | 11/2020 | Ouderkirk | G02B 5/3016 |
| 2020/0386932 A1* | 12/2020 | Sato | G02B 5/3016 |
| 2020/0389633 A1* | 12/2020 | Guo | G03B 21/2066 |
| 2020/0393690 A1* | 12/2020 | Lee | G02B 5/3016 |
| 2021/0011304 A1* | 1/2021 | Takaki | G02B 30/22 |
| 2021/0011319 A1* | 1/2021 | Sato | G02B 5/3016 |
| 2021/0026062 A1* | 1/2021 | Sato | C09K 19/3491 |
| 2021/0026154 A1* | 1/2021 | Hong | G02B 3/0056 |
| 2021/0033764 A1* | 2/2021 | Sato | G02B 27/0172 |
| 2021/0041364 A1* | 2/2021 | Yi | G01N 21/6486 |
| 2021/0058604 A1* | 2/2021 | Nakata | G03B 35/08 |
| 2021/0072551 A1* | 3/2021 | Gollier | G02B 27/0149 |
| 2021/0072570 A1* | 3/2021 | Abdulhalim | G02F 1/13363 |
| 2021/0080720 A1* | 3/2021 | Zhao | G03B 13/36 |
| 2021/0085178 A1* | 3/2021 | Shin | G02B 26/108 |
| 2021/0149199 A1* | 5/2021 | Guan | G02B 5/04 |

(56) References Cited

U.S. PATENT DOCUMENTS

| | | | | |
|---|---|---|---|---|
| 2021/0181675 A1* | 6/2021 | Liu | .......................... | G02B 3/10 |
| 2021/0208400 A1* | 7/2021 | Hong | ..................... | G02B 30/26 |
| 2021/0255534 A1* | 8/2021 | Pettitt | ................. | G02B 27/141 |
| 2021/0278684 A1* | 9/2021 | Garan | ................... | G02B 27/123 |
| 2021/0294106 A1* | 9/2021 | Meitav | ...................... | G06T 7/73 |
| 2021/0333456 A1* | 10/2021 | Ishioka | .............. | G02B 27/0172 |
| 2021/0382304 A1* | 12/2021 | You | ......................... | G02B 3/00 |
| 2022/0035158 A1* | 2/2022 | Ouderkirk | .......... | G02B 27/0101 |

FOREIGN PATENT DOCUMENTS

| | | | |
|---|---|---|---|
| CN | 107272200 A | 10/2017 | |
| CN | 107884940 A | 4/2018 | |
| CN | 107966813 A | 4/2018 | |
| CN | 108051925 A | 5/2018 | |
| CN | 108181708 A | 6/2018 | |
| CN | 108227209 A | 6/2018 | |
| CN | 108347597 A | 7/2018 | |
| CN | 108445633 A | 8/2018 | |
| CN | 109188700 A | 1/2019 | |

\* cited by examiner

OPTICAL DISPLAY SYSTEM, AR DISPLAY DEVICE AND VR DISPLAY DEVICE

CROSS-REFERENCE TO RELATED APPLICATIONS

The present application is a U.S. National Stage Application under 35 U.S.C. 371 of International Patent Application No. PCT/CN2019/104932, filed on Sep. 9, 2019, which is based on and claims priority to CN Patent Application No. 201811272620.5, filed on Oct. 30, 2018, the disclosure of both which are incorporated by reference herein in its entirety.

TECHNICAL FIELD

The present disclosure relates to the field of display, and particularly to an optical display system, an augmented reality (AR) display device, and a virtual reality (VR) display device.

BACKGROUND

When a three-dimensional object is viewed, a stereoscopic display can be formed in the brain. The principle thereof lies in that the left eye and the right eye respectively see the screens of the same scene in different perspectives, and these two screens result in parallax of the left eye and right eye. The brain may integrate the images in the two perspectives into a stereoscopic image.

During the viewing process, the two eyes adjust a diopter through a crystalline lens to focus an image of the object on a virtual image plane of the retina. When the brain integrates the image, with a depth difference between the three-dimensional object and the virtual image plane, the eyes need to perform convergence rotation to adapt to such depth difference. Based on the muscle memory of human eyes, there is a correlation between refraction adjustment and convergence rotation.

SUMMARY

In one aspect of the present disclosure, an optical display system is provided. The optical display system includes: a display screen; a first optical structure, disposed on a light emitting side of the display screen, and configured to divide light from the display screen into different types of polarized light; and a second optical structure, disposed on an emitting path of the different types of polarized light to an image forming side, and configured to form a plurality of virtual image planes corresponding to at least two focal lengths.

In some embodiments, the display screen includes a first area and a second area, and the first optical structure is configured to convert light from the first area into a first type of polarized light and convert light from the second area into a second type of polarized light.

In some embodiments, the first optical structure includes: a first polarizing device disposed on a light emitting side of the first area, and configured to convert light from the first area into the first type of polarized light; and a second polarizing device disposed on a light emitting side of the second area, and configured to convert light from the second area into the second type of polarized light.

In some embodiments, the first area and the second area are alternately arranged along at least one direction within a plane where the display screen is located.

In some embodiments, the first type of polarized light is P-polarized light, the second type of polarized light is S-polarized light, or the first type of polarized light is S-polarized light, the second type of polarized light is P-polarized light.

In some embodiments, the optical display system further includes: an optical path adjusting structure configured to adjust optical paths of the first type of polarized light and the second type of polarized light respectively, so that the first type of polarized light and the second type of polarized light are incident on an image forming side which is at a preset angle relative to the display screen.

In some embodiments, the light path adjusting structure includes: a third optical structure, disposed on a light emitting side of the first optical structure away from the display screen and configured to reflect the first type of polarized light separated by the first optical structure to the image forming side, and transmitting the second type of polarized light separated by the first optical structure; a fourth optical structure, disposed on one side of the third optical structure away from the first optical structure and configured to reflect the second type of polarized light transmitted through the third optical structure; and a fifth optical structure, disposed on one side of the fourth optical structure away from the image forming side, and configured to convert the second type of polarized light reflected by the fourth optical structure into the first type of polarized light and reflect the first type of polarized light back to the fourth optical structure; wherein the fourth optical structure is further configured to transmit the first type of polarized light reflected by the fifth optical structure to the image forming side.

In some embodiments, each of the third optical structure and the fourth optical structure includes a polarization beam splitting element.

In some embodiments, the fifth optical structure includes one of the following: a first reflector configured to reflect light from one side of the first reflector adjacent to the fourth optical structure and light from one side of the first reflector away from the fourth optical structure; or a second reflector configured to reflect light from one side of the second reflector adjacent to the fourth optical structure, and transmit light from one side of the second reflector away from the fourth optical structure.

In some embodiments, a surface on one side of the fifth optical structure adjacent to the fourth optical structure includes a concave reflector.

In some embodiments, the second optical structure is located in at least one of the following positions: between the first optical structure and the third optical structure, an emitting side of the first type of polarized light transmitted by the fourth optical structure, or an emitting side of the first type of polarized light reflected by the third optical structure.

In some embodiments, the first optical structure includes a polarizer or a polarizing film located on a light emitting side of the display screen.

In some embodiments, the second optical structure includes at least one of a plurality of optical lenses or a plurality of liquid crystal lenses disposed in an emitting path of the different types of polarized light to the image forming side, wherein focal lengths of optical lenses, through which various types of polarized light passes among the plurality of optical lenses, are different, and focal lengths of liquid crystal lenses, through which various types of polarized light passes among the plurality of liquid crystal lenses, are different.

In some embodiments, the second optical structure includes a liquid crystal lens, of which focal length is adjustable, and the optical display system further including: a pupil tracking device configured to track a gaze position of a viewer's pupil so that the focal length of the liquid crystal lens is adjusted according to a virtual image plane corresponding to the gaze position.

In some embodiments, the first area and the second area are alternately arranged at intervals along two mutually orthogonal directions respectively within a plane where the display screen is located, the optical display system further including: a third optical structure, a fourth optical structure, and a fifth optical structure; the third optical structure is disposed on a light emitting side of the first optical structure away from the display screen, and configured to reflect the first type of polarized light separated by the first optical structure to the image forming side, and transmit the second type of polarized light separated by the first optical structure; the fourth optical structure is disposed on one side of the third optical structure away from the first optical structure, and configured to reflect the second type of polarized light transmitted through the third optical structure, and transmit the first type of polarized light reflected by the fifth optical structure to an image forming side; the fifth optical structure is disposed on one side of the fourth optical structure away from the image forming side, and configured to convert the second type of polarized light reflected by the fourth optical structure into the first type of polarized light and reflect the first type of polarized light back to the fourth optical structure.

In some embodiments, the image forming side is at 90° relative to the display screen, a surface of the third optical structure for receiving light is at 45° relative to a direction of light emitting from the display screen, and a surface of the fourth optical structure for receiving light is at 135° relative to a direction of light emitting from the display screen.

In some embodiments, the first optical structure includes a polarizer or a polarizing film located on a light emitting side of the display screen; each of the third optical structure and the fourth optical structure includes a polarization beam splitting element; the fifth optical structure includes one of the following: a first reflector for receiving light from one side of the first reflector adjacent to the fourth optical structure and light from one side of the first reflector away from the fourth optical structure; or a second reflector for reflecting light from one side of the second reflector adjacent to the fourth optical structure and transmitting light from one side of the second reflector away from the fourth optical structure; and the second optical structure includes at least one of a plurality of optical lenses or a plurality of liquid crystal lenses disposed in an emitting path of the different types of polarized light to an image forming side.

In one aspect of the present disclosure, a virtual reality display device is provided. The virtual reality display device includes the optical display system as described above.

In another aspect of the present disclosure, an augmented reality display device is provided. The augmented reality display device includes the optical display system as described above.

BRIEF DESCRIPTION OF THE DRAWINGS

The accompanying drawings, which constitute part of this specification, illustrate exemplary embodiments of the present disclosure, and together with this specification, serve to explain the principle of the present disclosure.

The present disclosure may be more clearly understood based on the following detailed description with reference to the accompanying drawings, in which.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noted that, unless otherwise specified, the relative arrangements of the components and steps expounded in these embodiments should be construed as merely illustrative, rather than as a delimitation.

The words "first", "second", and similar words used in the present disclosure do not denote any order, quantity or importance, but merely serve to distinguish different parts. Such similar words as "comprising/including" or "containing" mean that the element preceding the word encompasses the elements enumerated after the word, and does not exclude the possibility of encompassing other elements as well. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (including technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

In the related display art of VR or AR, it is typical to use an optical design solution of a single focus. After research, it has been found that, the image presented by the optical design solution of a single focus has a constant image distance for human eyes, so that the viewer does not need to perform diopter adjustment when viewing the image. Since there is conflict (i.e., convergence conflict) produced between a convergence rotation of human eyes and a constant diopter adjustment, the viewer is prone to suffer from eye fatigue and dizziness during continuous view of dynamic 3D images.

In view of this, the embodiments of the present disclosure provide an optical display system, an AR display device, and a VR display device, which can improve the convergence conflict.

Figure 1:
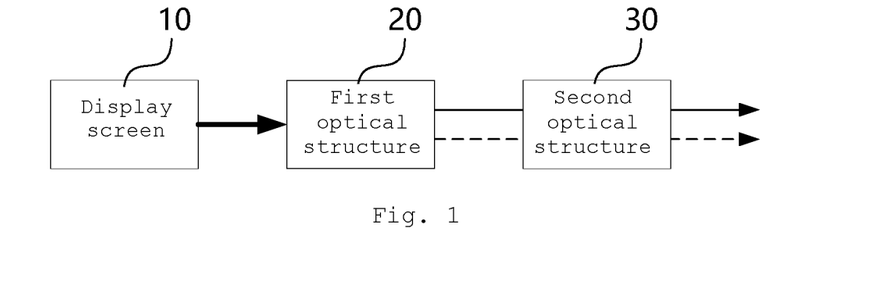
FIG. 1 is a schematic block view according to an embodiment of the optical display system of the present disclosure.

FIG. 1 is a schematic block view according to an embodiment of the optical display system of the present disclosure.

Referring to FIG. 1, in some embodiments, the optical display system includes a display screen 10, a first optical structure 20, and a second optical structure 30. The display screen 10 may display 2D or 3D images or videos. The first optical structure 20 is disposed on a light emitting side of the display screen and is configured to divide light from the display screen 10 into different types of polarized light. By way of the effect of the first optical structure on light, the light of the display screen 10 can be separated into different types of polarized light. For example, light at different positions of the display screen 10 can be separated into different types of polarized light, so as to implement further processing images at different positions. Different types of polarized light are not easy to interfere with each other. For example, the light of the display screen 10 can be divided into P-polarized light and S-polarized light.

FIG. 1 schematically embodies that light (thick solid line) from the display screen 10 is divided by the first optical structure 20 into two different types of polarized light, which are presented respectively by a thin solid line and a thin dotted line. This schematic form is also applicable to other accompanying drawings.

In some embodiments, the first optical structure 20 can include a polarizer located on a light emitting side of the display screen 10. In this way, the light from the display screen 10 can be first separated through a polarizer into a specific type of polarized light before emitting outward. In other embodiments, the first optical structure 20 can also include a polarizing film which can be located on the light emitting side of the display screen 10. In some embodiments, the polarizing film can be formed on a surface of a light emitting side of the display screen 10. The polarizing film can be in the form of a multi-layer film so as to manage the light transmitting property of each layer of film to orient the light in different directions. The polarizing film can reduce the interference of light emitting from adjacent locations of the display screen 10, and can also make the structure of the optical display system more compact. In other embodiments, the first optical structure 20 can also use other optical devices, such as a Nicol prism, which can divide the light of the display screen into different types of polarized light.

The second optical structure 30 which is disposed on an emitting path of the different types of polarized light to the image forming side, is configured to form virtual image planes corresponding to at least two focal lengths. The image forming side here can be a side where the viewer's retina is located or the projection screen is located. The focal length refers to a distance from the optical center of the optical structure to the focal point where the light is focused when there is parallel incident light. By way of the effect on different types of polarized light, the second optical structure 30 can form virtual image planes corresponding to at least two focal lengths, to allow that different image positions within the display screen 10 are in virtual image planes corresponding to different focal lengths, so that the optical display system can present the screens with different image distances in the image in the virtual image planes corresponding to multiple focal lengths as necessary, so as to prevent a converging conflict when the viewer views through the optical display system, thereby reducing or avoiding a phenomenon that the viewer suffers from eye fatigue and dizziness during a continuous view of dynamic 3D images.

In addition, different types of polarized light do not easily interfere with each other during the image forming process, thereby improving the image forming quality of the optical display system.

Figure 2:
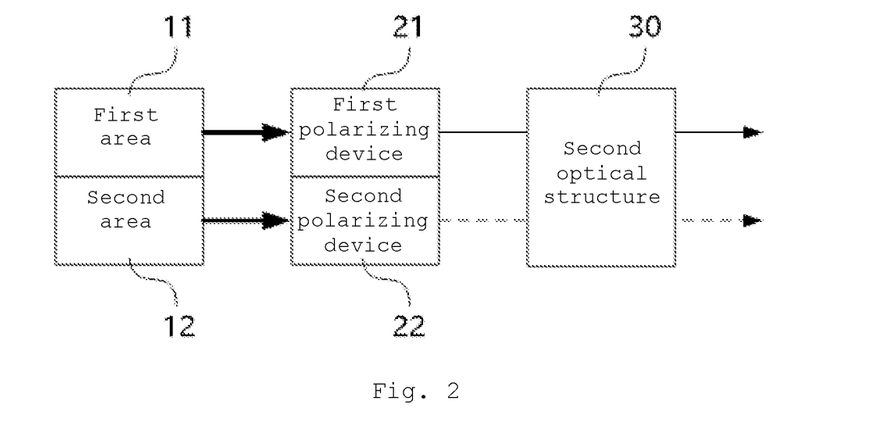
FIG. 2 is a schematic block view according to another embodiment of the optical display system of the present disclosure.

FIG. 2 is a schematic block view according to another embodiment of the optical display system of the present disclosure.

Referring to FIG. 2, in some embodiments, the display screen 10 can include a first area 11 and a second area 12. According to the display requirements, the first area 11 and the second area 12 can display the same image content, also display the complementary image contents, and can further respectively display different image contents that can be superimposed.

In the display screen 10 of the optical display system, at least one first area 11 and at least one second area 12 can be included. In some embodiments, the display screen 10 includes a plurality of first areas 11 and a plurality of second areas 12, wherein the first area 11 and the second area 12 can include at least one pixel respectively.

The first optical structure 20 can be configured to convert light from the first area into a first type of polarized light and convert light from the second area into a second type of polarized light. Referring to FIG. 2, the first optical structure 20 can include: a first polarizing device 21 and a second polarizing device 22. The first polarizing device 21 which is disposed on a light emitting side of the first area 11, is configured to convert light from the first area into the first type of polarized light. The second polarizing device 22 which is disposed on a light emitting side of the second area 12, is configured to convert light from the second area into the second type of polarized light. The first polarizing device 21 and the second polarizing device 22 can respectively use a polarizer or a polarizing film that transmits polarized light with different vibration directions.

For the first area 11 and the second area 12 at the pixel level, the first polarizing device 21 and the second polarizing device 22 can be designed to a size at a pixel level to implement the phase control of the light at the pixel level.

By way of the separation effect of the first polarizing device 21 and the second polarizing device 22, the image content displayed from the first area 11 emits outward with a first type of polarized light, and the image content displayed from the second area 12 emits outward with a second type of polarized light. Here, the first type of polarized light can be P-polarized light, and the second type of polarized light can be S-polarized light. In other embodiments, the first type of polarized light can also be S-polarized light, and the second type of polarized light can also be P-polarized light. Since the screen contents emitting with different types of polarized light are not easy to interfere with each other, the image quality viewed and the viewing comfort of the viewer are improved.

Figure 3:
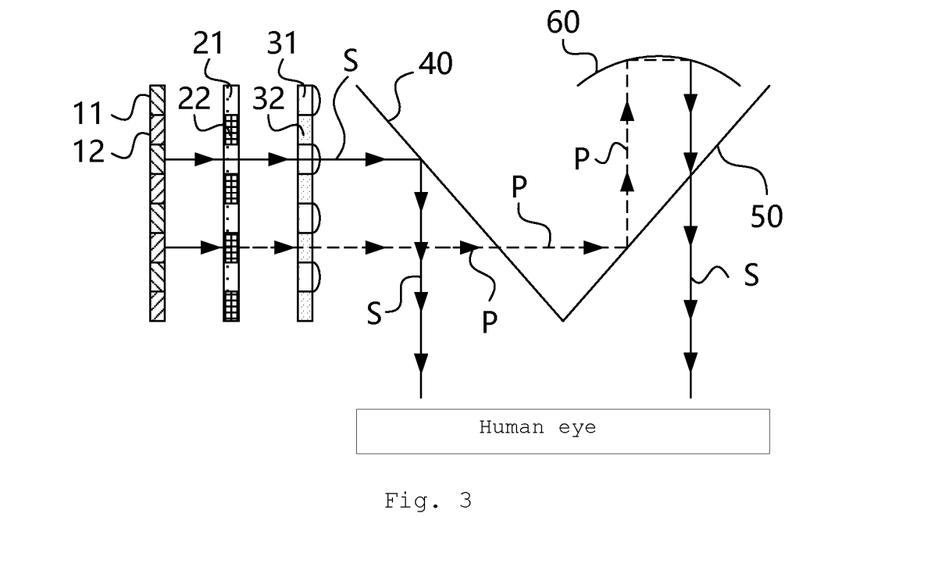
FIG. 3 is a schematic view of an optical path according to an embodiment of the optical display system of the present disclosure.

FIG. 3 is a schematic view of an optical path according to an embodiment of the optical display system of the present disclosure.

Referring to FIG. 3, in some embodiments, the first area 11 and the second area 12 can be alternately arranged along at least one direction within a plane where the display screen 10 is located. For example, a plurality of first areas 11 and a plurality of second areas 12 are alternately arranged along a first direction (e.g., a horizontal direction) of the plane where the display screen 10 is located, and a plurality of first areas 11 and a plurality of second areas 12 are also alternately arranged along a second direction (e.g., a vertical direction) of the plane where the display screen 10 is located. The first direction and the second direction are orthogonal to each other. With such configuration form of alternate arrangement, this can make overall screen effect to be presented more integrated and natural, and improve the viewing experience of the viewer.

Considering that in some devices applying an optical display system, since the display screen 10 and the image forming side (e.g. the side of the viewer's retina) might form a preset angle (e.g. 60°, 90°, or 120°), in some embodiments, the optical display system can further include an optical path adjusting structure. The optical path adjusting structure can be configured to adjust the light paths of the first type of polarized light and the second type of polarized light respectively, so that the first type of polarized light and the second type of polarized light are incident on the image forming side which is at a preset angle relative to the display screen.

Referring to FIG. 3, in some embodiments, the optical path adjusting structure can include: a third optical structure 40, a fourth optical structure 50, and a fifth optical structure 60. The third optical structure 40 is disposed on one side of the first optical structure 20 away from the display screen 10. The third optical structure 40 can be configured to reflect the first type of polarized light converted by the first optical structure 20 to an image forming side, and transmit the second type of polarized light converted by the first optical structure 20. For example, the third optical structure 40 in FIG. 3 which can reflect the horizontally rightward S-polarized light to a vertically downward direction, can also transmit the horizontally rightward P-polarized light.

The fourth optical structure 50 is disposed on one side of the third optical structure 40 away from the first optical structure 20. The fourth optical structure 50 can be configured to reflect the second type of polarized light transmitted through the third optical structure 40, and transmit the first type of polarized light reflected by the fifth optical structure 60 to the image forming side. For example, the fourth optical structure 50 in FIG. 3 which can reflect the horizontally rightward P-polarized light to a vertically upward direction, can also transmit the vertically downward S-polarized light reflected by the fifth optical structure 60.

In some embodiments, each of the third optical structure 40 and the fourth optical structure 50 can include a polarization beam splitting element, such as a polarization beam splitting prism or the like. In addition, in order to facilitate viewing by a viewer, the third optical structure 40 and the fourth optical structure 50 can be configured to allow the first type of polarized light reflected by the third optical structure 40 and the first type of polarized light transmitted through the fourth optical structure 40 to emit in the same direction. For example, in FIG. 3, the image forming side which is at 90° relative to the display screen, can configure the surface of the third optical structure 40 for receiving light to be at 45° relative to the direction of light emitting from the display screen, and configure the surface of the fourth optical structure 50 for receiving light to be at 135° relative to the direction of light emitting from the display screen. In this way, the horizontally rightward S-polarized light in FIG. 3 can be reflected by the third optical structure 40 to the image forming side where the human eye below is located, while the horizontally rightward P-polarized light is reflected by the fourth optical structure 50 to the fifth optical structure 60 above.

Referring to FIG. 3, the fifth optical structure 60 is disposed on one side of the fourth optical structure 50 away from the image forming side. The fifth optical structure can be configured to convert the second type of polarized light reflected by the fourth optical structure 50 into the first type of polarized light, and reflect it back to the fourth optical structure 50. The surface of one side of the fifth optical structure 60 adjacent to the fourth optical structure 50 can include a spherical or aspherical concave reflector, which can assist the second optical structure to adjust the focal length corresponding to the virtual image plane formed by the partially deflected light.

In some embodiments, the fifth optical structure 60, which can include a first reflector, can not only reflect light from one side of the first reflector adjacent to the fourth optical structure 50 (e.g., reflected light from the fourth optical structure 50), but also reflect light from one side of the first reflector away from the fourth optical structure 50, so as to avoid the influence of ambient light on the viewing of the viewer. Such solution is more suitable for a VR display device. Of course, a black coating or a light barrier can also be provided on the other side of the fifth optical structure 60, so as to eliminate the influence of ambient light on the viewing of the viewer.

In other embodiments, the fifth optical structure 60, which can include a second reflector, can not only reflect light from one side of the second reflector adjacent to the fourth optical structure 50 (e.g., reflected light from the fourth optical structure 50), but also transmit the light from one side of the second reflector away from the fourth optical structure 50, so that the viewer can also see the ambient environment while viewing the display screen. Such solution is more suitable for an AR display device.

The optical path adjusting structure is not limited to the form shown in FIG. 3, and other forms can be also be used. For example, at the same time when the position of the third optical structure 40 is maintained, the fourth optical structure 50 is provided to be parallel to the third optical structure 40. In this way, the S-polarized light is reflected by the third optical structure 40 to the image forming side where the human eye is located. The P-polarized light transmitted through the third optical structure 40 is reflected by the fourth optical structure 50 to the image forming side where the human eye is located, so that the provision of the fifth optical structure 60 can be omitted.

In the optical display system, a plurality of groups of the aforementioned optical path adjusting structures can be included. For example, each group of optical path adjusting structures correspond to a certain number (e.g., several to several tens) of pixels in the display screen, so as to optimize the display effect.

Referring to FIG. 3, in some embodiments, the second optical structure 30 is located between the first optical structure 20 and the third optical structure 40. In FIG. 3, the second optical structure 30 includes a first optical lens 31 provided in a path of light from the first area 11 in the display screen and a second optical lens 32 provided in a path of light from the second area 12 in the display screen. Moreover, the first optical lens 31 and the second optical lens 32 have different focal lengths. For example, the first optical lens 31 therein is a spherical or aspherical convex lens with a small focal length, and the second optical lens 32 is a spherical or aspheric convex lens with a large focal length, or a flat lens.

The first optical lens 31 and the second optical lens 32 can be set correspondingly according to the numbers and distribution positions of the first area 11 and the second area 12 respectively, so that the image contents from the first area 11 and the second area are in virtual image planes with different focal lengths. According to actual needs, the second optical structure 30 can further include optical lenses with more focal lengths, so that more screens with different image distances in the image are presented in virtual image planes with multiple focal lengths, thereby further improving a convergence conflict and eliminating the feeling of discomfort of the viewer. For example, the first optical lens 31 functions to enlarge an image, and the second optical lens 32 is only a transparent optical transmission film.

Figure 4:
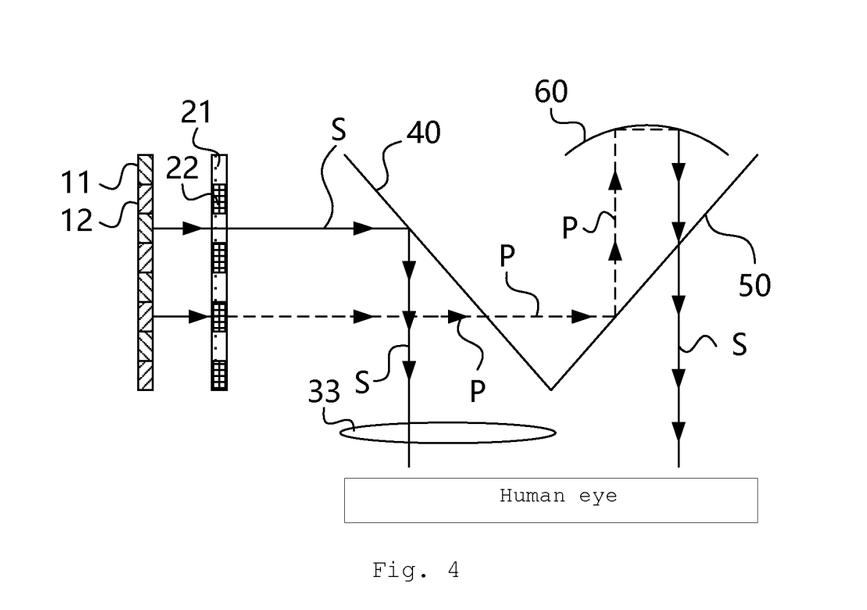
FIG. 4 is a schematic view of an optical path according to another embodiment of the optical display system of the present disclosure.

FIG. 4 is a schematic view of an optical path according to another embodiment of the optical display system of the present disclosure.

Referring to FIG. 4, compared with the embodiment shown in FIG. 3, the second optical structure 30 in the present embodiment includes a third optical lens 33 located on an emitting side of the first type of polarized light reflected by the third optical structure 40. The third optical lens 33 can also be disposed on an emitting side of the first type of polarized light transmitted through the fourth optical structure 50. For example, the third optical lens 33 on an emitting side of the S-polarized light reflected by the third optical structure 40 in FIG. 4 can include a spherical or aspherical convex lens with a small focal length, while the emitting side of the S-polarized light transmitted through the fourth optical structure 50 can be provided with a spherical or aspherical convex lens, or a flat lens, or cannot be provided with a lens.

Figure 5:
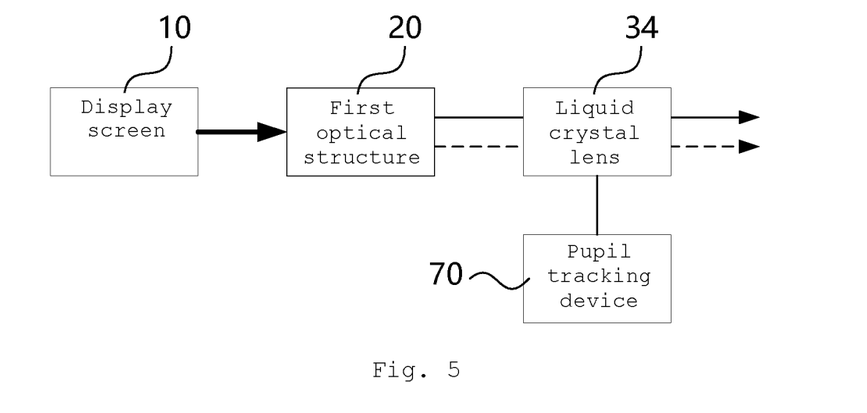
FIG. 5 is a schematic block view according to still another embodiment of the optical display system of the present disclosure.

FIG. 5 is a schematic block view according to still another embodiment of the optical display system of the present disclosure.

Referring to FIG. 5, in order to improve the display effect of the image, in some embodiments, the second optical structure 30 includes a liquid crystal lens 34, of which focal length is adjustable. The liquid crystal lens 34 is equivalent to the solution of changing the liquid crystal molecular arrangement of the liquid crystal layer by applying a voltage to form a plurality of structures similar to miniature optical lenses. The liquid crystal lens 34 can be arranged as shown in FIG. 3, that is, the film-like liquid crystal lens 34 is adjacent to or attached to the light emitting side of the first optical structure, and by controlling the voltage of the liquid crystal lens 34, the focal length of the liquid crystal lens 34 can be changed at different positions.

In order to improve the viewing effect of the viewer, in some embodiments, the optical display system can further include a pupil tracking device 70. The pupil tracking device 70 can be configured to track a gaze position of the viewer's pupil. After the gaze position of the pupil is obtained, the focal length of the liquid crystal lens 34 can be adjusted according to the virtual image plane corresponding to the gaze position, so that the image distance of the image at this position conforms more to an actual condition, thereby bringing a more realistic virtual experience to the viewer.

Various embodiments of the above-described optical display system can be suitable for various display devices, especially for wearable display devices, such as AR or VR display devices. Therefore, the present disclosure provides a virtual reality display device including the aforementioned optical display system. The present disclosure also provides an augmented reality display device including the aforementioned optical display system. The augmented reality display device or virtual reality display device of the present disclosure can also use a transparent or flexibly curved liquid crystal display, an organic light emitting diode, or other forms of display screens.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the present disclosure is defined by the appended claims.

What is claimed is:

1. An optical display system comprising:
   a display screen;
   a first optical structure, disposed on a light emitting side of the display screen, and configured to divide light from the display screen into different types of polarized light; and
   a second optical structure, disposed on an emitting path of the different types of polarized light to an image forming side, and configured to form a plurality of virtual image planes corresponding to at least two focal lengths, wherein the display screen comprises a plurality of first area and a plurality of second area, the plurality of first areas and the plurality of second areas are alternately arranged along at least one direction within a plane where the display screen is located, the first optical structure is configured to convert light from the first areas into a first type of polarized light and convert light from the second areas into a second type of polarized light, and the first optical structure comprises a polarizer or a polarizing film located on a light emitting side of the display screen, and image contents from the first areas and the second areas are in virtual image planes corresponding to different focal lengths, wherein the first optical structure comprises:
   a first polarizing device disposed on a light emitting side of the first area, and configured to convert light from the first area into the first type of polarized light; and
   a second polarizing device disposed on a light emitting side of the second area, and configured to convert light from the second area into the second type of polarized light, wherein the optical display system further comprising:
   a third optical structure, a fourth optical structure, and a fifth optical structure;

the third optical structure is disposed on a light emitting side of the first optical structure away from the display screen, and configured to reflect the first type of polarized light separated by the first optical structure to the image forming side, and transmit the second type of polarized light separated by the first optical structure;

the fourth optical structure is disposed on one side of the third optical structure away from the first optical structure, and configured to reflect the second type of polarized light transmitted through the third optical structure and transmit the first type of polarized light reflected by the fifth optical structure to an image forming side;

the fifth optical structure is disposed on one side of the fourth optical structure away from the image forming side, and configured to convert the second type of polarized light reflected by the fourth optical structure into the first type of polarized light and reflect the first type of polarized light back to the fourth optical structure, wherein the second optical structure is located in at least one of:

between the first optical structure and the third optical structure, an emitting side of the first type of polarized light transmitted by the fourth optical structure, or an emitting side of the first type of polarized light reflected by the third optical structure, and wherein the image forming side is at 90° relative to the display screen, a surface of the third optical structure for receiving light is at 45° relative to a direction of light emitting from the display screen, a surface of the fourth optical structure for receiving light is at 135° relative to a direction of light emitting from the display screen, and wherein the third optical structure and the fourth optical structure reflect light to where a user's eye is located.

2. The optical display system according to claim 1, wherein the first type of polarized light is P-polarized light, the second type of polarized light is S-polarized light, or the first type of polarized light is S-Polarized light, the second type of polarized light is P-polarized light.

3. The optical display system according to claim 1, further comprising:

an optical path adjusting structure configured to adjust optical paths of the first type of polarized light and the second type of polarized light respectively, so that the first type of polarized light and the second type of polarized light are incident on an image forming side which is at a preset angle relative to the display screen.

4. The optical display system according to claim 3, wherein the optical path adjusting structure comprises:

a third optical structure, disposed on a light emitting side of the first optical structure away from the display screen and configured to reflect the first type of polarized light separated by the first optical structure to the image forming side, and transmitting the second type of polarized light separated by the first optical structure;

a fourth optical structure, disposed on one side of the third optical structure away from the first optical structure and configured to reflect the second type of polarized light transmitted through the third optical structure; and a fifth optical structure, disposed on one side of the fourth optical structure away from the image forming side, and configured to convert the second type of polarized light reflected by the fourth optical structure into the first type of polarized light and reflect the first type of polarized light back to the fourth optical structure;

wherein the fourth optical structure is further configured to transmit the first type of polarized light reflected by the fifth optical structure to the image forming side.

5. The optical display system according to claim 4, wherein each of the third optical structure and the fourth optical structure comprises a polarization beam splitting element.

6. The optical display system according to claim 4, wherein the fifth optical structure comprises at least one of:

a first reflector configured to reflect light from one side of the first reflector adjacent to the fourth optical structure and light from one side of the first reflector away from the fourth optical structure; or a second reflector configured to reflect light from one side of the second reflector adjacent to the fourth optical structure, and transmit light from one side of the second reflector away from the fourth optical structure.

7. The optical display system according to claim 4, wherein a surface on one side of the fifth optical structure adjacent to the fourth optical structure comprises a concave reflector.

8. The optical display system according to claim 1, wherein the second optical structure comprises at least one of a plurality of optical lenses or a plurality of liquid crystal lenses disposed in the emitting path of the different types of polarized light to the image forming side, wherein focal lengths of optical lenses, through which various types of polarized light passes among the plurality of optical lenses, are different, and focal lengths of liquid crystal lenses, through which various types of polarized light passes among the plurality of liquid crystal lenses, are different.

9. The optical display system according to claim 1, wherein the second optical structure comprises a liquid crystal lens, of which focal length is adjustable, and the optical display system further comprising:

a pupil tracking device configured to track a gaze position of a viewer's pupil so that the focal length of the liquid crystal lens is adjusted according to a virtual image plane corresponding to the gaze position.

10. The optical display system according to claim 1, wherein the first optical structure comprises a polarizer or a polarizing film located on a light emitting side of the display screen;

each of the third optical structure and the fourth optical structure comprises a polarization beam splitting element;

the fifth optical structure comprises at least one of: a first reflector for receiving light from one side of the first reflector adjacent to the fourth optical structure and light from one side of the first reflector away from the fourth optical structure; or a second reflector for reflecting light from one side of the second reflector adjacent to the fourth optical structure and transmitting light from one side of the second reflector away from the fourth optical structure; and the second optical structure comprises at least one of a plurality of optical lenses or a plurality of liquid crystal lenses disposed in the emitting path of the different types of polarized light to an image forming side.

11. A virtual reality display device comprising the optical display system according to claim 1.

12. An augmented reality display device comprising the optical display system according to claim 1.

* * * * *